Patented Aug. 14, 1945

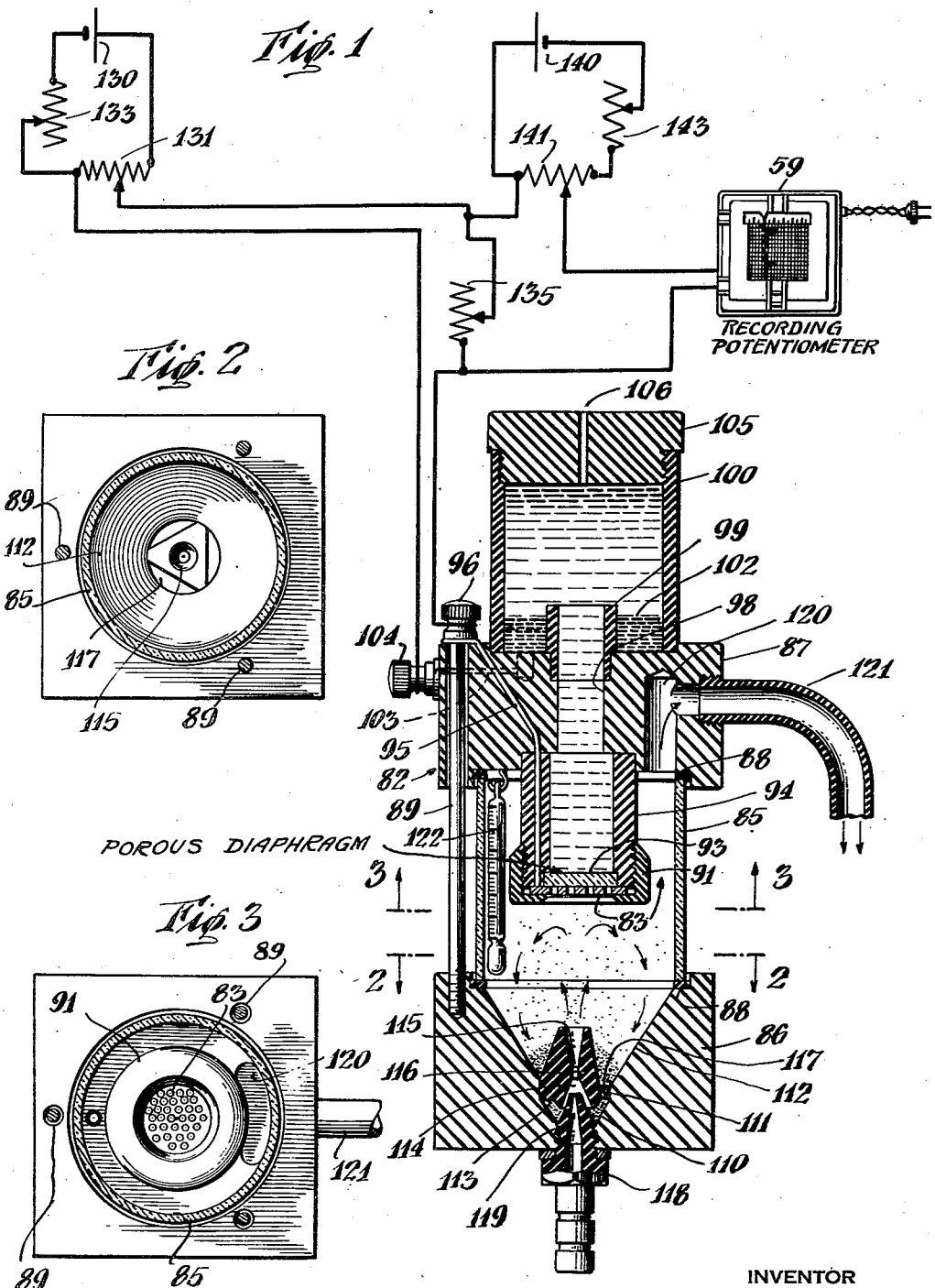

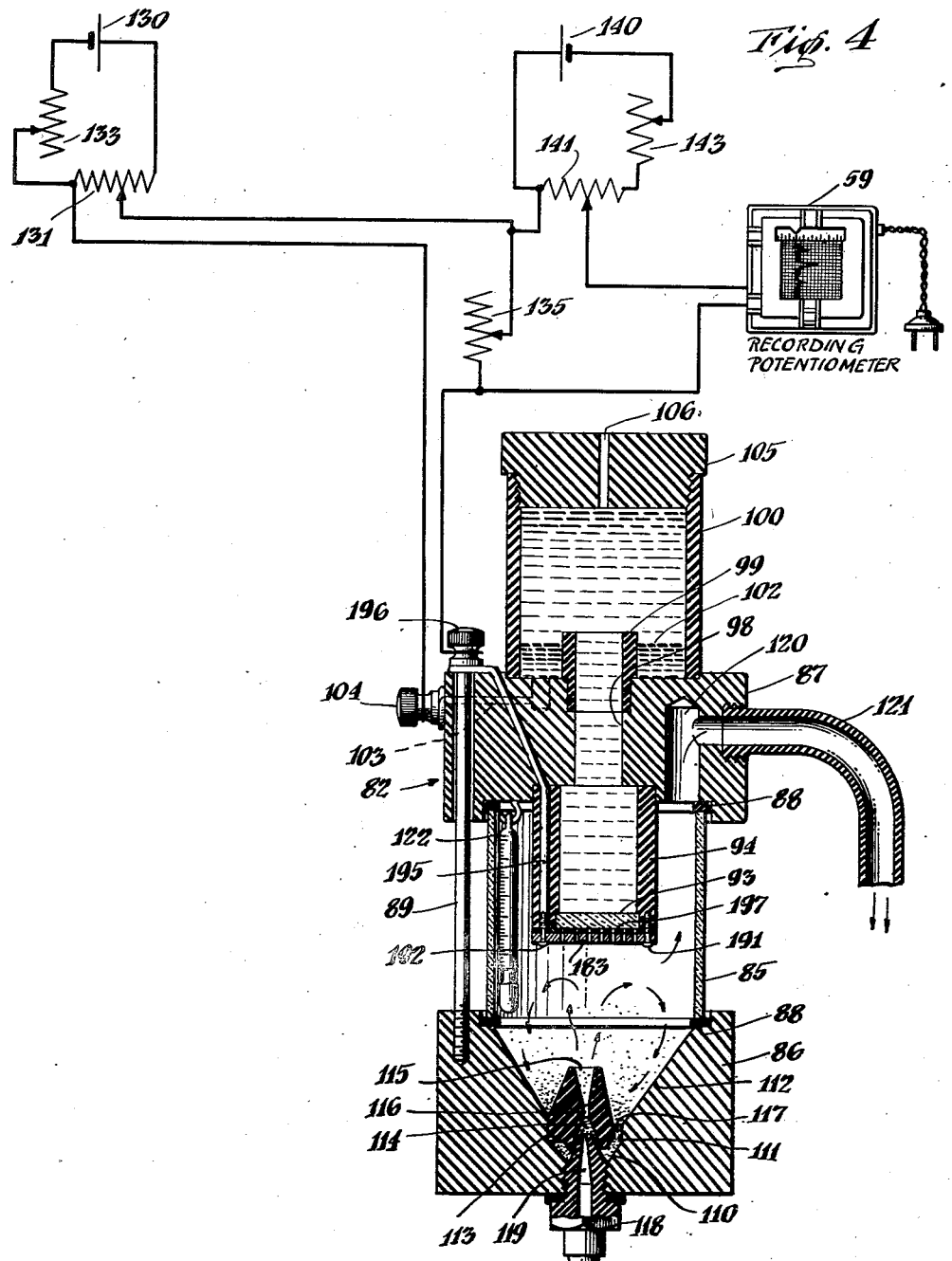

2,382,735

UNITED STATES PATENT OFFICE 2,382,735

ELECTRICAL CELL APPARATUS

Henry Clay Marks, Bloomfield, N. J., assignor to Wallace & Tiernan Products, Inc., Belleville, N. J., a corporation of New Jersey Application April 24, 1941, Serial No. 390,074

8 Claims. (Cl. 204—195)

This invention relates to electrical cell apparatus, and particularly electrode structure thereof, such as is adapted for use in detecting the chemical condition of liquids, e. g. to afford a corresponding indication, record or treatment control. One procedure for testing liquids electrically, for example to detect the concentration of oxidizing or reducing materials therein, is the so-called depolarization method, exemplified by systems of the character disclosed in the pending application of Charles F. Wallace, Serial No. 290,842, filed August 18, 1939, now Patent No. 2,350,378, granted June 6, 1944 and the depolarization systems originally described in my copending application Serial No. 372,208, filed December 28, 1940, of which latter application the present application is a continuation-in-part, and also disclosed in a division thereof, Serial No. 566,352, filed December 2, 1944. In such procedures, which involve detecting the depolarization produced by a medium under test upon an electrode exposed thereto, it is in a number of cases very desirable that one electrode, e. g. the other electrode, be kept out of contact with the medium under test. Furthermore, the separated electrode should preferably be surrounded by a medium of constant composition. To attain these ends, the separated electrode may be immersed in a solution of an electrolyte which is connected electrically to the liquid under test, through a "salt bridge" or a porous "diaphragm," so that by a diffusion process the liquid under test is electrically associated to the constant medium around the other electrode, and so that the internal electrical circuit, i. e. the connection between the electrodes within the cell, is established while contamination of one medium by the other is prevented.

In the depolarization method, a polarizing E. M. F. is applied across the electrodes and the current flowing between them, which varies with changes in the extent of depolarization produced by the liquid under test upon the electrode exposed thereto, is detected as a measure or indication of the concentration of oxidizing or reducing substance. Tests have shown that in certain cases the amount of current, which should be governed by the depolarization effect, is apt to vary widely with the amount of dissolved solids present in the liquid under test, and with other extraneous factors. It has consequently been found desirable to arrange the cell so that the current is as independent as possible of the electrolytic conductivity or resistivity of the liquid; and an important object of the present invention is to provide structure, for electrical cells, in which one electrode is exposed to a liquid under test and the other electrode is maintained in a constant medium electrically associated to the first-mentioned liquid, and which at the same time minimizes and indeed practically obviates the effect, upon the current or other desired electrical quantity detectable between the electrodes, of the electrolytic conductivity (or in other words, the resistivity) of the liquid under test.

Further objects are to provide new and improved electrode structure for cells such as those of the character described, which is more reliable and provides more sensitive and satisfactory results; to provide novel and particularly efficient means for reducing to a minimum the electrical path through the liquid under test between one electrode and another in a cell; and also to provide electrical cell apparatus wherein changes or other effect of the conductivity (or resistivity) of an electrolyte may be substantially eliminated with respect to the detection of electrical phenomena, such as depolarization current which otherwise might be undesirably influenced by such changes or effect.

To these and other ends, a presently preferred form of the invention is involved in structure of the following character: The electrode which is to be in the medium of constant composition is exposed in or to an electrolyte having low electrical resistance, for instance a solution such as normal potassium chloride or half normal hydrochloric acid. The stated electrode and its substantially constant electrolyte are associated in a chamber that is separated from the liquid under test by a porous separating device which advantageously includes a conducting surface, part or body exposed to the liquid under test. For example, a particularly effective structure of such device comprises a porous partition, such as porous porcelain, alundum, porous rubber, tightly packed asbestos fibres, or the like, and has mounted next to the partition a thin, flat sieve of conducting material to provide the electrode that is exposed to the liquid under test. Thus such electrode may consist of a thin sheet of metal perforated with many small holes or like freely permeable and directly conductive member, held tightly against the porous diaphragm.

Bearing in mind that the porous separating device, by its porous construction, is such as to prevent mutual contamination of the separated liquids while affording the desired electrical contact (as by ionic diffusion), it will be seen that the described arrangements fulfill the stated objects, and specifically serve to reduce the electrical path through the liquid under test (i. e., in the path between the electrodes) to an extremely short distance. Since the resistance of a liquid path in a cell is proportional to the length of the path, the result is that changes in conductivity of the liquid under test have practically no influence on the amount of current, for example, that can flow through the cell; and the device is truly responsive to the depolarization or other effect sought to be measured.

By way of example, certain desirable cell and electrode structures are shown in the accompanying drawings, wherein:

Fig. 1 is a view partly in section and partly diagrammatic, of a cell (shown in vertical section) incorporating a presently preferred embodiment of the invention, with one example of an electrical system useful therewith;

Figs. 2 and 3 are horizontal sections of the cell shown in Fig. 1, respectively on lines 2—2 and 3—3 thereof; and Fig. 4 is a view similar to Fig. 1, illustrating a modification of the electrode structure.

Referring first to Figs. 1 to 3 inclusive, the structure is illustratively shown for use in a depolarization system and is intended to record or indicate the results on a suitable instrument, such as the recording potentiometer 59. The cell structure itself, generally designated 82, includes an electrode 83 for exposure to the liquid under test. The actual circuit shown is arranged for response to anode depolarization, and hence the response may directly indicate the concentration of reducing material in the liquid, or by inversion, the amount of an oxidizing agent such as residual chlorine where the liquid has also been treated with a predetermined amount of reducing agent in the manner originally described in my aforesaid application Serial No. 372,208; but it will be understood that the cells of the invention may be used for cathode depolarization testing, or with still other circuits or for detection of other electrical effects, and in any case, for control purposes (as in control of treating or other composition-adjusting procedures) in lieu of, or in addition to, indication or recording.

The cell comprises a cylindrical housing 85, conveniently of glass, which is clamped between hard rubber blocks 86 and 87 with the cooperation of interposed live rubber gaskets 88, and advantageously by means of a plurality of clamping rods or bolts 89.

The electrode 83, which is preferably made of gold, platinum or other precious metal, is perforated with holes in the form of a sieve and is secured by a suitable hard rubber clamping ring 91 to the under side of a porous porcelain disk 93. The clamping of the electrode, which has its peripheral edge engaged by the ring 91, is conveniently effected by threaded engagement of the ring with a hard rubber tube 94 that extends down into the cylinder 85. The porcelain disk 93 is seated in the lower end of the tube 94, so that the ring 91 clamps the electrode 83 and the disk 93 together and in place at the end of the tube 94, as shown. The tube 94 is pressed or cemented into an appropriate recess in the under side of the block 87. A lead wire 95 is swaged to the top side or edge of the electrode 83 and extends to a binding post 96, conveniently on the end of one of the clamping rods 89. In some cases, it is desirable to coat the upper or inner surface of the rare metal electrode disk 83 with a suitable insulating lacquer (not shown in Fig. 1), so as to retard or prevent any undesirable action (on the face of the electrode next to the porcelain disk 93) due to the employment of a corrosive solution within the tube 94 and the associated chamber hereinafter described.

The upper end of the tube 94 opens into an aligned tubular passage 98 which extends vertically through the block 87 and is itself extended above the upper surface of the block by a further tubular element 99 which may be threaded into the block, as shown. A somewhat larger cylindrical member 100 is pressed or cemented into the upper surface of the block 87, so as to provide a chamber which communicates with the tube 94 through the tubular structure 98, 99 and into which the member 99 extends upwardly so as to provide an annular cavity or recess about the outer surface of the tube 99. In this cavity there may be disposed a quantity of mercury 102 for contact with liquid in the chamber 100. Electrical connection with the mercury pool 102 is afforded by lead wire 103 extending to binding post 104. The upper end of the chamber 100 is closed with a suitable cap 105 threaded therein and having a vent 106.

The illustrated device conveniently includes electrode-cleaning arrangements of the character described and claimed in the copending application of Charles F. Wallace, Serial No. 290,841, filed August 18, 1939 for Electrodes and cells and methods of operation thereof. To that end, the lower block 86 of the cell is provided with a recess that opens into the chamber 85, and comprises a lower, upwardly flaring, frusto-conical opening 110, a cylindrical bore 111 and a further upwardly flaring frusto-conical opening 112 which communicates directly with the cylinder 85. A Venturi member 113, say of hard rubber, is fixedly mounted in the cylindrical bore 111 and has a vertical internal passage comprising oppositely directed frusto-conical openings 114, 115, terminating at their smaller ends in the cylindrical opening or throat 116. The exterior surface of the Venturi member 113 is shaped somewhat in the form of a pair of triangular pyramids joined at their bases in the region of the bore 111, so as to provide openings 117 through which material may pass or drop from the frusto-conical opening 112 into the frusto-conical opening 110.

From the bottom of the block 86, a fitting 118 provides for admission of liquid to the cell and includes a nozzle 119 that extends within the lower frusto-conical opening 114 of the member 113. It will thus be seen that when liquid under suitable pressure or head is supplied to the fitting 118, the nozzle 119 and the member 113 constitute a venturi through which the liquid passes as it enters the cell chamber 85.

A suitable quantity of abrasive material, such as particles of alundum, garnet, emery, sand, or other suitable abrasive or scouring materials, preferably of non-conducting character, is initially placed in the opening 110, or the openings 112 and 110. When liquid under pressure is supplied to the fitting 118, a jet thereof issues from the nozzle 119 through the passage of the Venturi member 113 and impinges upon the lower or exposed surface of the electrode 83. Abrasive material is automatically entrained in the jet, and thus produces a scouring or rubbing action on the electrode surface, which tends to clean the surface and specifically to remove undesirable material that might collect and foul or otherwise desensitize the electrode surface. As the abrasive material is heavier than the liquid flowing through the cell, it does not escape with the liquid, but drops downwardly into the opening 112 and usually through the passages 117, for re-entrainment in the jet. It will now be understood that the jetting action and entrainment of abrasive particles is automatic and continuous as long as liquid under pressure is supplied to the cell through fitting 118. Escape of liquid from the cell is through an upward passage 120 in the upper block 87, which communicates with a discharge conduit 121. The chamber encompassed within cylinder 100 and through the described tubular structure to the upper surface of the porcelain disk 93, is conveniently filled with a neutral salt solution, for example, a saturated aqueous solution of potassium chloride, and thus forms a salt bridge between the electrode 83 and the annular mercury pool 102.

As stated, for purposes of illustration, the cell is shown connected for response to anodic depolarization, e. g. to determine the amount or the excess of a reducing agent in the liquid supplied through the fitting 118, as detected from the depolarizing effect of the liquid on the electrode 83 serving as an anode in the circuit now to be described. A circuit comprising the battery 130, a potentiometer 131, and a rheostat 133, provides means whereby from the variable output of the potentiometer 131, any desired voltage may be applied to the cell circuit. The cell, represented by its terminals 96, 104, and a variable voltage dropping resistance 135, are connected in series across the output of the potentiometer 131. A convenient value under the circumstances for the battery 130 is 1.5 volts, and the rheostat may have a total resistance of 2000 ohms, the potentiometer 131 a total resistance of 1000 ohms, and the voltage dropping device 135 a total resistance of the order of 10,000 ohms.

A further circuit comprising the battery 140, a potentiometer 141, and a rheostat 143, may comprise a network having similar values to those given, by way of example, for the circuit of battery 130. The network including battery 140 conveniently serves to provide a biasing voltage across the variable output of the potentiometer 141 which is connected in circuit with the voltage dropping resistance 135 and the input of the recording potentiometer 59. It may be explained that the biasing voltage produced across the output of the potentiometer 141 may be placed in either an opposite or additive relationship (depending on the polarity of the battery 140) to the voltage produced across the resistance 135, whereby means are provided for biasing the indicator or pen arm of the recording potentiometer 59 to any desired position.

As will now be understood by those skilled in the art, current is caused to flow in the circuit comprising the cell (and including its electrodes 83, 102), potentiometer 131 and resistance 135. Assuming that the indicator or recording pen of the potentiometer 59 has taken a position corresponding to a given net voltage determined by the combination of the voltages across the resistance 135 and the output of potentiometer 141 (as explained hereinabove), a change in the flow of current in the circuit of the cell will produce a corresponding change in the voltage drop across resistance 135, and cause the arm of the meter 59 to take up a new position and reading in consequence. It will further be seen that the changes in reading of the recording potentiometer 59 may thus be directly and readily correlated to changes in voltage drop across the resistor 135, or, more specifically, to such changes in current through the circuit of the last-mentioned resistance and the cell, as are occasioned by changes in composition of the liquid passing through the cell chamber 85.

As stated, a predetermined voltage is applied to the circuit of the cell 82 from the network including battery 130, and the effect of the liquid under test, e. g. insofar as it contains an active reducing agent, is to produce electrode depolarization, at the anode 83, to an extent corresponding to the amount of reducing agent in the liquid; where the liquid is chlorine-treated water or the like and a reducing agent has been added in known amount (and in excess), the extent of depolarization will be governed by the unoxidized portion of reducing agent and hence in effect will depend on the amount of residual chlorine originally in the water. Changes in the composition of the liquid thus create changes in current in the cell circuit and corresponding voltage variations across the resistance 135, and the corresponding registration of these voltage changes by the recording potentiometer can be readily correlated to the content of the particular material or class of materials sought to be measured in the sampling of liquid delivered to the cell.

Changes in the temperature of the liquid flowing through the cell ordinarily tend to affect the readings obtained from the potentiometer 59 and therefore a thermometer 122 is shown suspended within the cell to indicate the temperature of the liquid, whereupon suitable correction may be applied to the chart readings of the meter 59 or corresponding correction may be made by adjustment of the rheostat 135, to compensate for the temperature changes.

It will now be seen that the arrangement not only provides for effective exposure of the electrode 83 to the liquid under test, for example so as to permit detection of the depolarization effect in the associated electric circuit as shown, but also reduces to a minimum the effect of changes in conductivity or resistivity of the liquid under test. The path between the liquid at the surface of electrode 83 and the bridge consisting of the salt solution above the diaphragm 93, is extremely short, particularly in comparison with the total path between the electrodes 83 and 102 of the cell. Inasmuch as the resistance of the salt solution extending between electrode 102 and the porous member 93, is constant, it will be understood that changes in the resistance of the minute, remaining part of the path between the electrodes having only a negligible effect on the current through the resistance 135, and thus no appreciable effect on the reading of the potentiometer. The indication of the latter is thus truly and reliably proportioned to the depolarization effect, which in turn affords an accurate measure of the oxidizing or reducing substance in the liquid under test.

Fig. 4 shows a slightly modified form of the electrode structure in Fig. 1. In Fig. 4 the exposed electrode consisting of the perforated metal disk 183, is held against the porous member 93 and the tube 94 by screws 191 and 192, the latter being conveniently threaded into an appropriate recess at the end of a metal rod 195. The rod 195 corresponds to the conductor 95 of Fig.

1, and provides for connection of the electrode to a suitable terminal 108 at the side of the cell. For the sake of illustration and since it is preferable in many cases, a thin layer of insulating material 107 is shown disposed between the thin perforated electrode 103 and the porous member 93. For example, the insulating material, conveniently impervious to liquid, may be in the form of a sheet having perforations congruent with those of the electrode 103 and may comprise a coating of insulating lacquer or cement (on the electrode) or a separate sheet of mica, Celluloid, other insulating plastic, or like material.

According to present experience, precious metal electrodes such as gold and platinum may sometimes be disposed directly against the outer surface of the porous member (as actually shown in Fig. 1) without deleterious effect on the results when the cell is used in a depolarization system. On the other hand, where an electrode such as mercury is employed which may be corroded by, or may otherwise react with, the electrolyte constituting the salt bridge, it appears desirable to insulate the electrode from actual contact with a porous surface of the separating member. According to my present belief, the polarization of the inside surface of a gold electrode (i. e., the surface against the porous member 93) when it is disposed, without insulation, in the arrangement of Fig. 1, prevents short circuit with the electrolyte on the other side of the porous member; but the corrosive action on electrode metals such as mercury apparently tends to dissipate such polarization and create what is in effect a short circuit. It will be understood that the exposed electrode in various forms of the invention may be made of various suitably conductive materials, of which the precious metals (now preferred for anode depolarization), mercury, copper, graphite and the like may be mentioned by way of example. For instance, a copper electrode is at present preferred for a cell used in a cathode depolarization system, and ordinarily should be insulated (e. g. as in Fig. 4) to prevent undesirable corrosive effects of the sort explained above.

Referring more generally to the various disclosed embodiments of the invention, it will be understood that the medium of constant composition for communication between the porous separating device and the separated electrode may be selected to suit the particular cell and system involved. Ordinarily, the medium should have a relatively high conductivity, and should preferably be non-corrosive to the materials with which it must come in contact; or stated otherwise, the materials, such as the exposed electrode, should be non-corrodible, at least unless insulated from the electrolyte as shown in Fig. 4. In many instances a solution of alkali metal halide is satisfactory, of which examples are potassium chloride and sodium chloride; and in general a relatively strong solution, e. g. 2 normal, is preferable. In some cases, however, other types of electrolyte may be used, such as an acid solution.

It will now be appreciated that the illustrated structures afford eminently satisfactory cells for such purposes as the detection of changes in composition of liquids, and involve a reduction of the electrical path through the liquid under test to a minimum. As a result, the path of current between the electrodes, of which one is preferably maintained in a medium of constant composition, has a minimum resistance and indeed is one which for most purposes is in effect independent of changes in conductivity of the liquid under test.

While the invention is particularly advantageous for devices employed in depolarization systems, it will be understood that the structures are useful for other cells and procedures, for instance in devices which depend on electrode potential for indication of the condition of a liquid under test. Frequently in attempting to detect the composition, or changes in composition of a liquid by determination of the potential imparted to an electrode exposed thereto, the conductivity of the liquid under test is so low as to present serious difficulty in making the necessary electrical readings, at least unless a galvanometer of extreme sensitivity is employed. With arrangements of the sort here shown such difficulties may be avoided. It may be explained that ordinarily when these arrangements are to be utilized for potential-responsive cells, each electrode exposed to liquid under test should be insulated from contact with the medium on the other side of the porous member, for example by utilizing a structure of the sort shown in Fig. 4.

It is to be understood that the invention is not limited to the structures and arrangements herein illustrated and described, but may be embodied in other forms, combinations or systems, without departure from its spirit as defined by the following claims.

I claim:

1. An electrolytic depolarization cell, comprising a container separated into two chambers by a porous diaphragm of non-conducting material permitting the passage of electric current therethrough when permeated with a solution of an electrolyte but which effectively prevents any substantial mixing of liquids in said two chambers, an electrode in one of said chambers, which chamber is filled at least as to the path between said electrode and said diaphragm with an electrolyte solution, a plate-like electrode in the other of said chambers closely adjacent to and substantially parallel with said diaphragm and separated therefrom solely by an intervening thin layer of insulating material, said plate-like electrode and said layer of insulating material having a plurality of substantially registering perforations therethrough, so that a liquid in contact with the second-named electrode may penetrate through said registering perforations to said diaphragm, and means for conducting a liquid to be tested into and out of the second of said chambers for contact while in said second chamber with the second named electrode.

2. A cell in accordance with claim 1, for determining the available chlorine content of an aqueous liquid, wherein the second named electrode which is adapted for contact with a liquid containing available chlorine is of a precious metal.

3. A cell in accordance with claim 1, wherein the second named electrode, which is adapted for contact with a liquid having a characteristic to be determined, is of copper.

4. A cell in accordance with claim 1, wherein the porous diaphragm, the insulating layer, and the second named electrode are all clamped solidly together by a collar of electrically non-conducting material.

5. A cell in accordance with claim 1, wherein the insulating material interposed between said plate-like electrode and said diaphragm comprises a coating of an electrically non-conducting material onto the face of said plate-like electrode disposed toward said diaphragm.

6. A cell in accordance with claim 1, wherein the first named electrode comprises a coil of wire immersed in the electrolyte liquid in the first named chamber adjacent to but not touching said diaphragm.

7. A cell in accordance with claim 1, wherein the first named electrode comprises a pool of liquid mercury in contact with the liquid electrolyte in the first named chamber.

8. A cell in accordance with claim 1, wherein means are provided for continuously circulating a liquid through the chamber of the cell in contact with the second named electrode, including means to direct a jet of this liquid toward the second named electrode, and an outlet means from said chamber remote from said second named electrode.

HENRY CLAY MARKS.